US012555969B2

(12) United States Patent
Masujima

(10) Patent No.: US 12,555,969 B2
(45) Date of Patent: Feb. 17, 2026

(54) PRINTING DEVICE, PRODUCTION METHOD FOR DEVICE USING COUPLING BOARD, AND COUPLING BOARD

(71) Applicant: SEIKO EPSON CORPORATION, Tokyo (JP)

(72) Inventor: Daiki Masujima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 741 days.

(21) Appl. No.: 17/935,137

(22) Filed: Sep. 26, 2022

(65) Prior Publication Data

US 2023/0102227 A1 Mar. 30, 2023

(30) Foreign Application Priority Data

Sep. 28, 2021 (JP) ................................ 2021-157776

(51) Int. Cl.
*H01R 43/26* (2006.01)
*H01R 31/06* (2006.01)
*H01R 13/73* (2006.01)

(52) U.S. Cl.
CPC ........... *H01R 43/26* (2013.01); *H01R 31/065* (2013.01); *H01R 13/73* (2013.01)

(58) Field of Classification Search
CPC ...................................................... H01R 31/06
USPC .................................. 439/924.1, 924.2, 638
See application file for complete search history.

(56) References Cited

U.S. PATENT DOCUMENTS

| | | | | | |
|---|---|---|---|---|---|
| 4,900,261 | A * | 2/1990 | Gentry | H01R 13/6273 | 439/353 |
| 5,295,843 | A * | 3/1994 | Davis | H01R 13/6485 | 439/924.1 |
| 5,563,731 | A * | 10/1996 | Asahi | H01S 3/13013 | 359/341.41 |
| 6,319,066 | B2 * | 11/2001 | Kuo | H01R 13/6658 | 439/76.1 |
| 6,364,713 | B1 * | 4/2002 | Kuo | H01R 31/06 | 439/79 |
| 11,381,024 | B2 * | 7/2022 | Xu | H01R 43/20 | |
| 2013/0163175 | A1 | 6/2013 | Kim et al. | | |
| 2016/0085200 | A1 | 3/2016 | Fujita et al. | | |
| 2018/0024613 | A1 | 1/2018 | Matsumoto | | |

FOREIGN PATENT DOCUMENTS

| | | | |
|---|---|---|---|
| JP | 2004-085944 | A | 3/2004 |
| JP | 2015-507790 | A | 3/2015 |
| JP | 2016-062006 | A | 4/2016 |
| JP | 2018-020551 | A | 2/2018 |
| JP | 2019-059085 | A | 4/2019 |
| WO | 2013/91104 | A1 | 6/2013 |

* cited by examiner

*Primary Examiner* — Phuong K Dinh
(74) *Attorney, Agent, or Firm* — Spencer Fane LLP

(57) ABSTRACT

A printing device includes: a first storage device; a second storage device; a coupling board having a first connector to which the first storage device is directly coupled from a first direction and a second connector to which the second storage device is directly coupled from a second direction that is different from the first direction, the coupling board being a rigid board; a printing mechanism executing print processing; a control board where a control circuit controlling the printing mechanism is provided; and a coupling mechanism to which the control board and the coupling board are coupled.

10 Claims, 7 Drawing Sheets

PRINTING DEVICE, PRODUCTION METHOD FOR DEVICE USING COUPLING BOARD, AND COUPLING BOARD

The present application is based on, and claims priority from JP Application Serial Number 2021-157776, filed Sep. 28, 2021, the disclosure of which is hereby incorporated by reference herein in its entirety.

BACKGROUND

1. Technical Field

The present disclosure relates to a printing device, a production method for a device using a coupling board, and a coupling board.

2. Related Art

According to the related art, it is demanded that print data representing an image should be stored in a printing device. For example, JP-A-2019-59085 discloses a printing device having two HDDs, two connectors coupled to the two HDDs respectively, and a coupling board electrically coupled to the connectors. HDD is an abbreviation of hard disk drive. In this printing device, the two HDDs are coupled to the connectors from the same direction.

However, in the above related-art coupling board, when two units such as two HDDs are attached to the connectors from the same direction, a large force is applied to the connectors and the coupling board and can cause an abnormality in the coupling board such as detachment of the coupling board from the surface where the coupling board is fixed or deformation of the coupling board. Therefore, the related-art coupling board has a problem in that it is difficult to attach two units to the coupling board without generating any abnormality in the coupling board.

SUMMARY

In order to solve the foregoing problem, printing device according to an aspect of the present disclosure includes: a first storage device; a second storage device; a coupling board having a first connector to which the first storage device is directly coupled from a first direction and a second connector to which the second storage device is directly coupled from a second direction that is different from the first direction, the coupling board being a rigid board; a printing mechanism executing print processing; a control board where a control circuit controlling the printing mechanism is provided; and a coupling mechanism to which the control board and the coupling board are coupled. The control circuit causes the printing mechanism to execute the print processing, based on data read out from one or both of the first storage device and the second storage device via the coupling mechanism and the coupling board.

A production method according to another aspect of the present disclosure is a production method for a device using a coupling board. The coupling board is a rigid board and has a first connector to which a unit provided in a first direction is directly coupled and a second connector to which a unit provided in second direction that is different from the first direction is directly coupled. The production method includes: a first process of directly coupling a second unit to the second connector from the second direction; and a second process of fixing the second unit to the device.

A coupling board according to still another aspect of the present disclosure is a coupling board which is a rigid board includes: a first connector to which a first unit provided in a first direction is directly coupled; and a second connector to which a second unit provided in a second direction that is different from the first direction is directly coupled.

DESCRIPTION OF EXEMPLARY EMBODIMENTS

Figure 1:
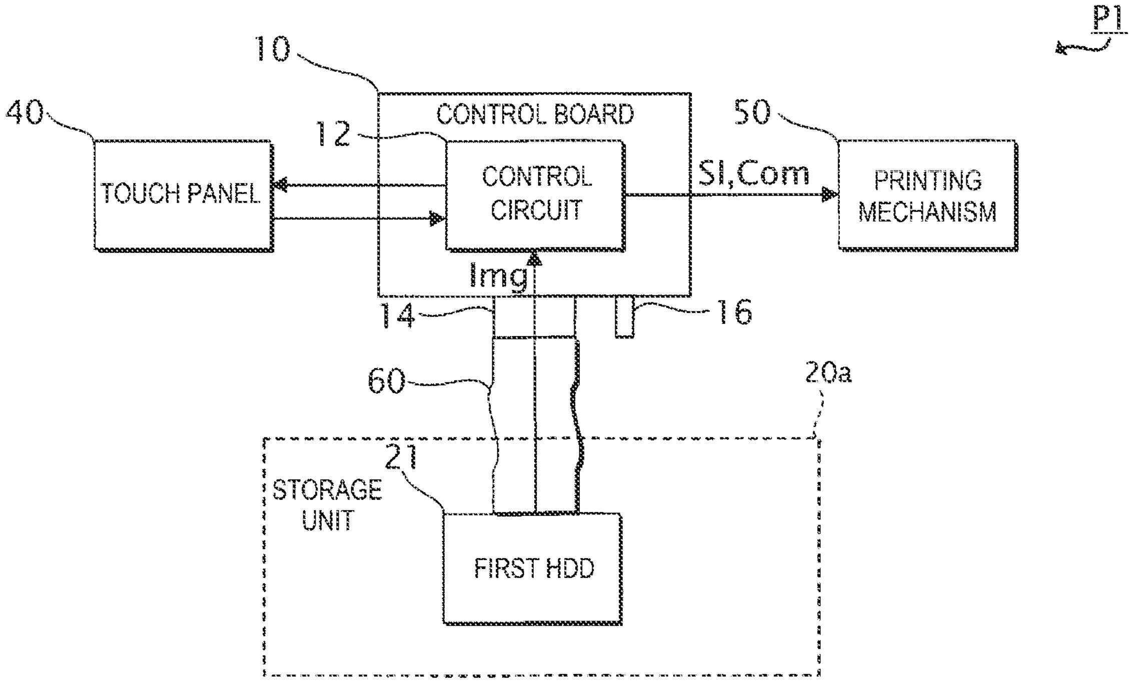
FIG. 1 shows an example of the configuration of a pre-additional installation printing device P1.

A mode for embodying the present disclosure will now be described with reference to the drawings. However, the dimension and scale of each part in the drawings differ from reality where appropriate. Also, while the embodiment described below is a preferred specific example of the present disclosure and therefore includes various technically preferable limitations, the scope of the present disclosure is not limited to the embodiment unless it is particularly described below that the present disclosure should be limited.

1. First Embodiment

In this embodiment, a printing device P forming an image on a print medium is described. The print medium is a recording paper such as a normal paper. Also, an additional HDD can be easily installed to the printing device P. In the description below, the printing device P before an additional HDD is installed is referred to as a "pre-additional installation printing device P1" and the printing device P after an additional HDD is installed is referred to as a "post-additional installation printing device P2". In the description below, the printing device P is a general term for the pre-additional installation printing device P1 and the post-additional installation printing device P2.

1.1. Configuration of Printing Device P

FIG. 1 shows an example of the configuration of the pre-additional installation printing device P1. Typically, the printing device P is a so-called multifunction machine, which is an inkjet printer ejecting ink and forming an image on a print medium and also has a scanning function.

The printing device P is supplied with print data Img representing an image to be formed by the printing device P and information representing the number of copies of the image to be formed by the printing device P. The print data Img is received from a personal computer and a host computer of a digital camera or the like. The printing device P executes print processing of forming the image represented by the print data Img, on a print medium. The printing device P may also generate image data by the scanning function and use the generated image data as the print data Img.

As illustrated in FIG. 1, the pre-additional installation printing device P1 has a control circuit 12 provided at a control board 10, a storage unit 20*a*, a printing mechanism 50, a touch panel 40, and a communication cable 60. The communication cable 60 is an example of a "coupling mechanism". Although the pre-additional installation printing device P1 also has a scanning mechanism executing scanning, the description thereof is omitted to simplify the explanation.

The control board 10 is a board where a wiring for transmitting various signals outputted from the control circuit 12 and the storage unit 20*a* or the like and a wiring for supplying electric power to drive the control circuit 12 or the like are formed. The control board 10 is typically a rigid board but may be a board with flexibility. The board with flexibility is a flexible board such as a COF, FPC or FFC. COF is an abbreviation of chip on film. FPC is an abbreviation of flexible printed circuits. FFC is an abbreviation of flexible flat cable.

The control circuit 12 is formed, including a CPU. CPU is an abbreviation of central processing unit. However, the control circuit 12 may have a programmable logic device such as an FPGA instead of the CPU. FPGA is an abbreviation of field programmable gate array. The control circuit 12 controls the storage unit 20*a*, the printing mechanism 50, and the touch panel 40.

The control board 10 has a communication connector 14 and a power connector 16 in addition to the control circuit 12. The communication connector 14 is directly coupled to the communication cable 60. In this embodiment, directly coupling means coupling without using another device as an intermediary. More specifically, the communication connector 14 and one end of the communication cable 60 are fitted together and the one end of the communication cable 60 is thus directly coupled to the communication connector 14. The communication connector 14 is in conformity with the SATA standard. SATA is an abbreviation of serial ATA. ATA is an abbreviation of advanced technology attachment. The ATA is an interface between a PC and a storage device. PC is an abbreviation of personal computer. The SATA is a standard for transferring data by a serial transfer method. According to the SATA standard, electric power can be supplied as well. The power connector 16 is used after an additional HDD is installed.

The storage unit 20*a* stores a control program for the printing device P, the print data Img, and other information. The storage unit 20*a* has a first HDD 21. The first HDD 21 is a storage device storing data. The first HDD 21 is an example of a "first storage device" and is also an example of a "first unit". One end of the communication cable 60 is directly coupled to the first HDD 21.

The touch panel 40 has a function for inputting information and a function for outputting information to outside. The touch panel 40 is formed, including a display panel such as a liquid crystal panel, an electronic paper panel or an organic electroluminescence panel. However, the printing device P may have an input device such as a keyboard and an output device such as a display, instead of the touch panel 40.

The printing mechanism 50 executes printing on a print medium, based on an instruction from the control circuit 12. More specifically, the control circuit 12 causes the storage unit 20*a* to store the print data Img. For example, when a user of the printing device P operates the touch panel 40 and thus gives an instruction to store the print data Img in the storage unit 20*a*, the control circuit 12 causes the storage unit 20*a* to store the print data Img. Alternatively, when the control circuit 12 determines that the print data Img should be stored in the storage unit 20*a* based on the information representing the number of copies of the image to be formed by the printing device P, the control circuit 12 causes the storage unit 20*a* to store the print data Img. The control circuit 12 causes the printing mechanism 50 to execute printing, based on the print data Img read out from the storage unit 20*a*. More specifically, the control circuit 12 supplies a drive signal Com for driving the printing mechanism 50 and a control signal SI for controlling the printing mechanism 50. The printing mechanism 50 is driven by the drive signal Com under the control of the control signal SI, ejects ink from a part or all of a plurality of nozzles provided in the printing mechanism 50, and thus forms an image on a print medium.

Aa a specific form of printing, the printing mechanism 50 may employ any one of a piezo method in which a piezoelectric element is used to eject ink, a thermal method in which a thermoelectric element is used to eject ink, a thermal transfer method, a thermosensitive method, and a laser method in which toner is melted by heat and thus fixed to a print medium.

Figure 2:
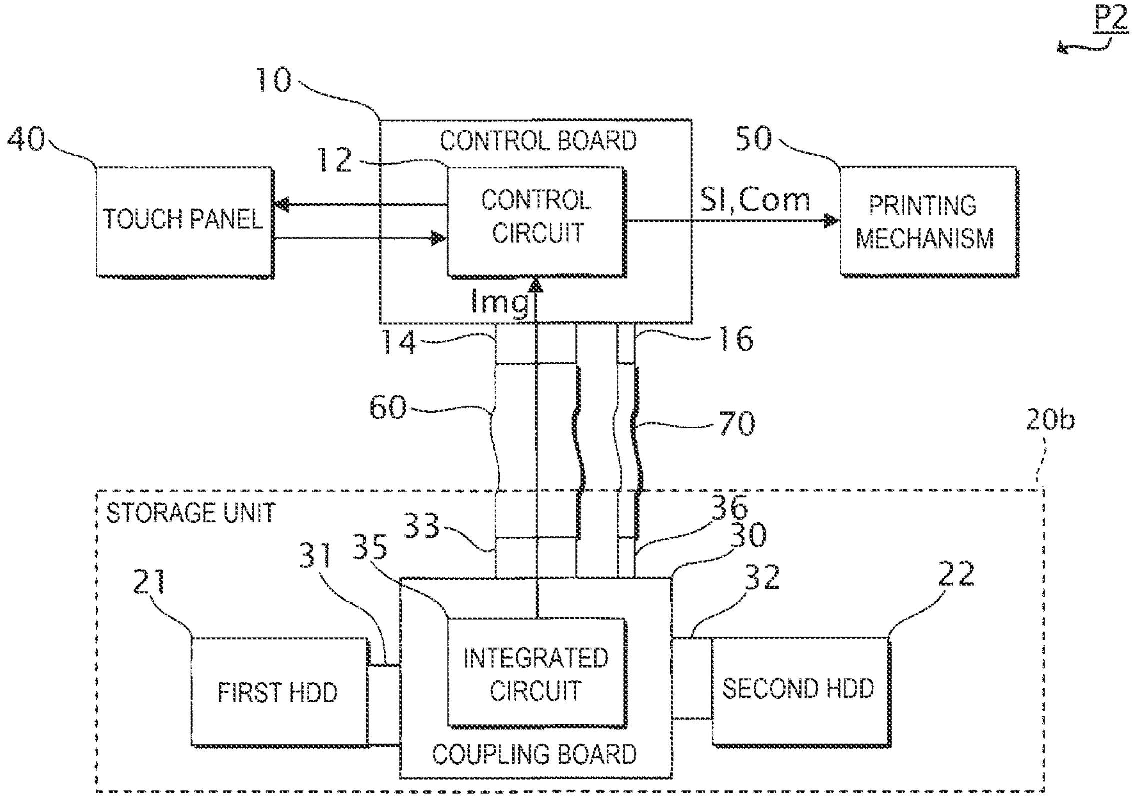
FIG. 2 shows an example of the configuration of a post-additional installation printing device P2.

FIG. 2 shows an example of the configuration of the post-additional installation printing device P2. A person installing an additional HDD installs an additional HDD to the pre-additional installation printing device P1. Hereinafter, the person installing an additional HDD is referred to as an "additional installation worker".

The post-additional installation printing device P2 differs from the pre-additional installation printing device P1 in having a storage unit 20*b* instead of the storage unit 20*a* and having a power cable 70. The storage unit 20*b* differs from the storage unit 20*a* in having a second HDD 22, and an integrated circuit 35 provided at a coupling board 30, in addition to the first HDD 21. The second HDD 22 is a storage device storing data. The second HDD 22 is substantially in the form of a flat rectangular parallelepiped.

The second HDD 22 is an example of a "second storage device" and is also an example of a "second unit". The post-additional installation printing device P2 is an example of a "device using a coupling board".

The control circuit 12 causes the first HDD 21 and the second HDD 22 to store the same print data Img. More specifically, in this embodiment, RAID, which is a technology for recognizing a plurality of storage devices as one storage device, is used. RAID is an abbreviation of redundant arrays of inexpensive disks. A plurality of levels exist in RAID. In this embodiment, RAID 1 is employed. RAID 1 is a technology also referred to as mirroring and for storing the same data in a plurality of storage devices. Even when trouble occurs in one storage device of a plurality of storage devices, mirroring enables data to be read out from the other storage device(s). Therefore, resistance to trouble can be improved, compared with a configuration where mirroring is not employed.

The coupling board 30 is a board where a wiring for transmitting various signals outputted from the integrated circuit 35, the first HDD 21, and the second HDD 22 or the like, and a wiring for supplying electric power to drive the integrated circuit 35, the first HDD 21, and the second HDD 22 or the like, are formed. The coupling board 30 is a rigid board.

The coupling board 30 has a first connector 31, a second connector 32, a third connector 33, and a power connector 36, in addition to the integrated circuit 35. The first HDD 21 is directly coupled to the first connector 31. The second HDD 22 is directly coupled to the second connector 32. One end of the communication cable 60 is directly coupled to the third connector 33.

The integrated circuit 35 communicates with one or both of the first HDD 21 and the second HDD 22, based on a communication from the control circuit 12. In other words, the control circuit 12 communicates with one or both of the first HDD 21 and the second HDD 22. Therefore, it can also be said that the control circuit 12 is a "communication circuit communicating with one or both of a first unit and a second unit". It can also be said that the control board 10 is a "communication board where a communication circuit is provided".

In order to implement mirroring, when the integrated circuit 35 has received a communication representing a request to write the print data Img from the control circuit 12, the integrated circuit 35 transmits a communication representing a request to write the print data Img to the first HDD 21 and the second HDD 22. Also, when the integrated circuit 35 has received a communication representing a request to read out the print data Img from the control circuit 12, the integrated circuit 35 transmits a communication representing a request to read out the print data Img to the first HDD 21 and the second HDD 22. The integrated circuit 35 transmits the print data Img read out from the first HDD 21 or the second HDD 22, to the control circuit 12.

The power cable 70 is a cable coupling the control board 10 and the coupling board 30 together. As illustrated in FIG. 2, one end of the power cable 70 is directly coupled to the power connector 16 and the other end of the power cable 70 is directly coupled to the power connector 36. The power cable 70 supplies electric power to drive the coupling board 30, the first HDD 21, and the second HDD 22, from the control board 10 to the coupling board 30.

In the post-additional installation printing device P2, too, the control circuit 12 causes the printing mechanism 50 to execute printing, based on the print data Img read out from the storage unit 20*b*, that is, the print data Img read out from the first HDD 21 or the second HDD 22.

1.2. External Appearance of Printing Device P

In order to show that the additional installation worker can easily install the second HDD 22 as an additional HDD, the external appearance of the printing device P will now be described, using FIGS. 3, 4, and 5. The external appearance of the printing device P is common to the pre-additional installation printing device P1 and the post-additional installation printing device P2. Therefore, the printing device P, which is a general term for the pre-additional installation printing device P1 and the post-additional installation printing device P2, is used for the description with reference to FIGS. 3, 4, and 5.

Figure 3:
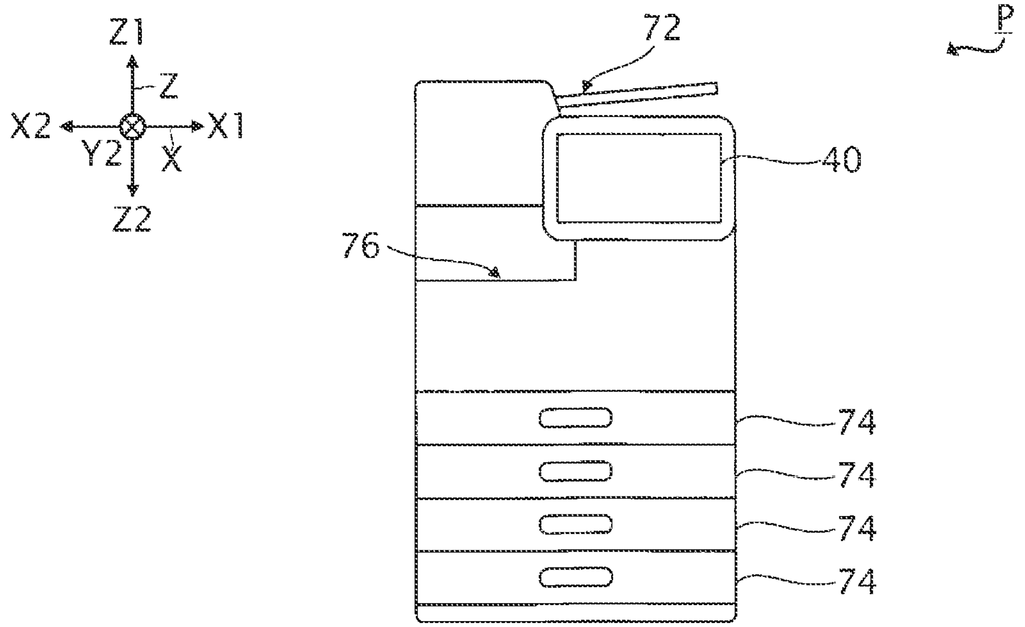
FIG. 3 is a front view of a printing device P.

FIG. 3 is a front view of the printing device P. As prescribed in FIG. 3, an X-axis, a Y-axis, and a Z-axis are employed in the description below. One direction along the X-axis as viewed from an arbitrary point is referred to as an X1-direction and the direction opposite to the X1-direction is referred to as an X2-direction. Similarly, the opposite directions along the Y-axis from an arbitrary point are referred to as a Y1-direction and a Y2-direction. The opposite directions along the Z-axis from an arbitrary point are referred to as a Z1-direction and a Z2-direction. An X-Y plane including the X-axis and the Y-axis is equivalent to a horizontal plane. The Z-axis is an axial line along a vertical direction. The Z2-direction is equivalent to a downward vertical direction. The X-axis, the Y-axis, and the Z-axis may intersect each other at an angle of approximately 90 degrees. The term "approximately 90 degrees" includes the case where the angle can be regarded as 90 degrees in consideration of an error in manufacturing, as well as the case where the angle is perfectly 90 degrees.

The printing device P, as a whole, is substantially in the shape of a rectangular parallelepiped. As illustrated in FIG. 3, the printing device P has a document tray 72, a plurality of paper feed trays 74, and a paper discharge tray 76, in addition to the touch panel 40 shown in FIGS. 1 and 2. The document tray 72 is provided at the top side of the printing device P. The paper feed trays 74 and the paper discharge tray 76 are provided at the front side of the printing device P. The document tray 72 accommodates a paper to be read by the scanning function. The paper feed trays 74 accommodate a print medium before an image is formed thereon. In the paper discharge tray 76, a print medium with an image formed thereon is loaded.

Figure 4:
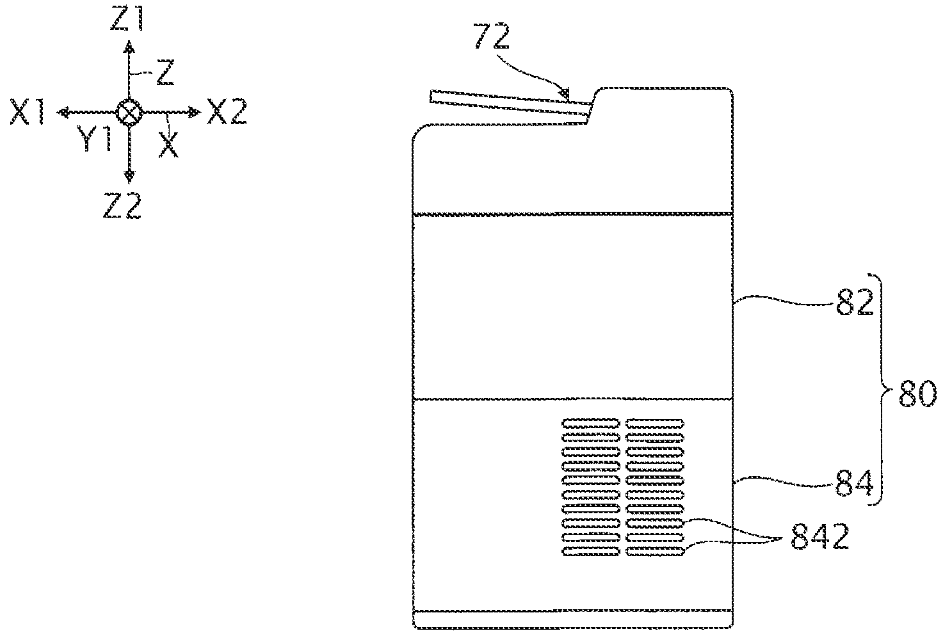
FIG. 4 is a back view of the printing device P.

FIG. 4 is a back view of the printing device P. As illustrated in FIG. 4, the printing device P has an exterior 80 at the back side of the printing device P. The exterior 80 accommodates the control board 10, the storage unit 20*a* or the storage unit 20*b*, and the printing mechanism 50. The exterior 80 has a cover 82 and a back-side lower member 84. The cover 82 covers an opening 821 shown in FIG. 5.

The cover 82 is an example of a "first cover".

A plurality of exhaust ports 842 are provided in the back-side lower member 84. The exhaust ports 842 are openings provided to discharge heat generated from the printing mechanism 50 or the like to outside the printing device P.

Figure 5:
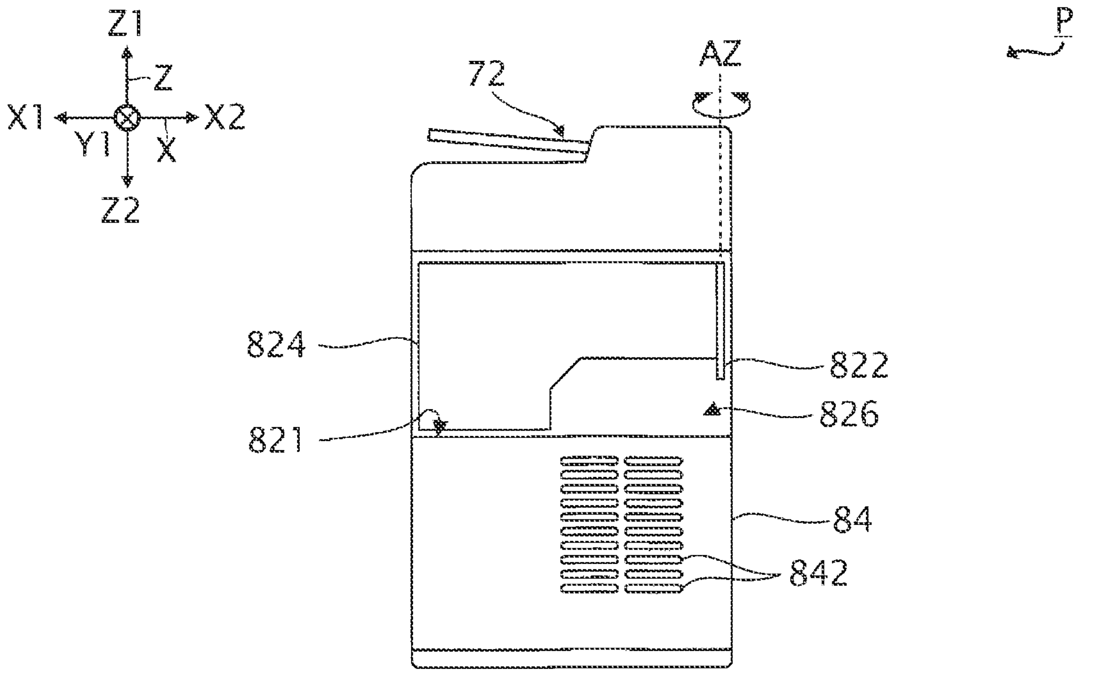
FIG. 5 is a back view of the printing device P, where a cover 82 has been removed from the printing device P.

FIG. 5 is a back view of the printing device P, where the cover 82 has been removed from the printing device P. As illustrated in FIG. 5, the opening 821 is exposed as the cover 82 is removed from the printing device P. A support plate 822, an accommodation box 824, and an inner wall surface 826 of the printing device P are provided inside the opening 821. A part of the inner wall surface 826 is covered with the accommodation box 824. The support plate 822 is a flat member extending along a YZ plane. Also, the support plate 822 is fixed to the inner wall surface 826 at an end in the Y1-direction.

The accommodation box 824 is a hollow box having a width along the Y-axis. The accommodation box 824 has a door, not illustrated. As this door is opened, the inside of the accommodation box 824 is exposed. The control board 10 is accommodated inside the accommodation box 824. The width along the Z-axis of the accommodation box 824 becomes narrower along the X2-direction. As the width becomes narrower, a step is formed in the accommodation box 824. Also, the accommodation box 824 is attached to the support plate 822 via a hinge, not illustrated, at an end in the X2-direction. With this hinge, the accommodation box 824 is rotatable about an axis AZ parallel to the Z-axis. The printing device P may not have the support plate 822, and the accommodation box 824 may be directly attached to the inner wall surface 826 via a hinge. The state where the accommodation box 824 is rotated about the axis AZ will now be described, using FIG. 6.

Figure 6:
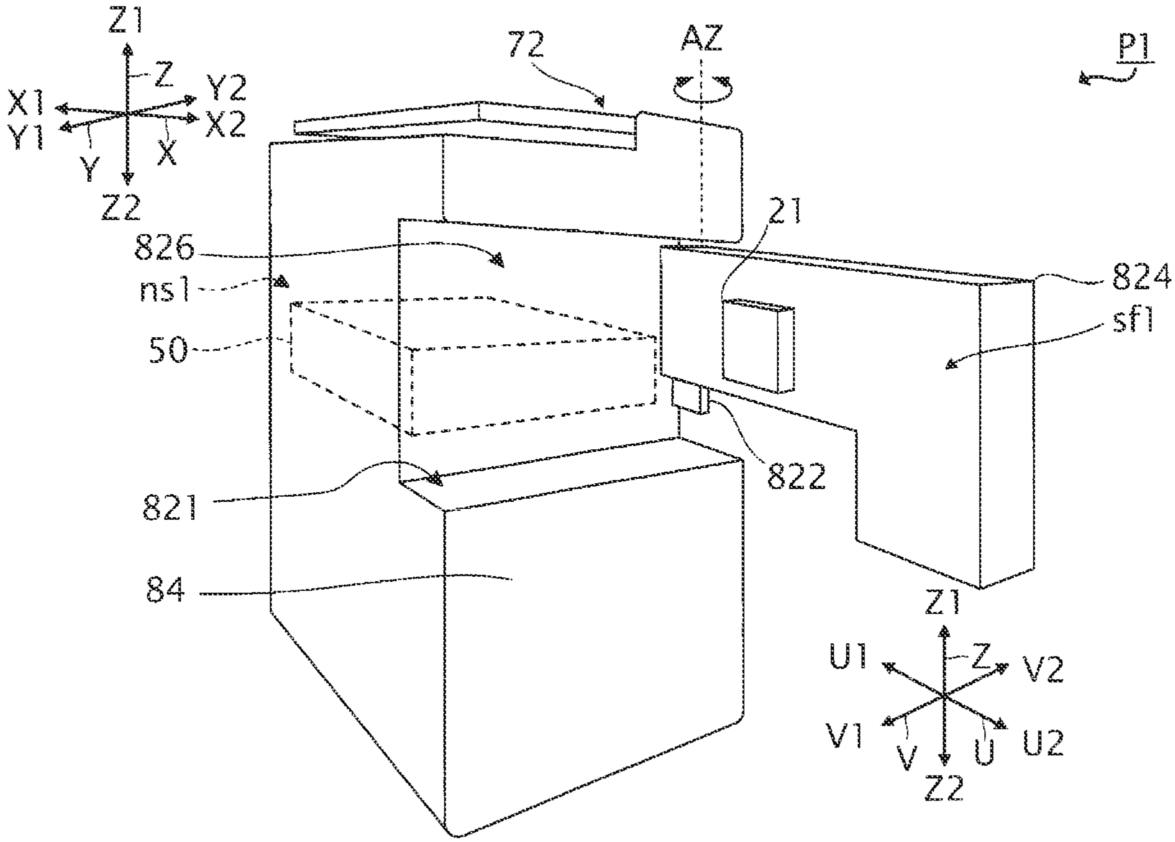
FIG. 6 is a two-point perspective view showing a state where an accommodation box 824 is rotated about an axis AZ.

FIG. 6 is a two-point perspective view showing the state where the accommodation box 824 is rotated about the axis AZ. FIG. 6 shows the state where the accommodation box 824 is rotated about the axis AZ in the pre-additional installation printing device P1. Also, in FIG. 6, the illustration of the communication cable 60, the wiring coupling the control board 10 and the touch panel 40 together, the wiring coupling the control board 10 and the printing mechanism 50 together, and the exhaust ports 842, is omitted in order to prevent the complication of the drawing.

As the accommodation box 824 is rotated about the axis AZ, the part covered with the accommodation box 824, of the inner wall surface 826, is exposed. The accommodation box 824 covers a part of the inner wall surface 826 and therefore can be said to be a cover. Also, the accommodation box 824 can cover and expose a part of the inner wall surface 826 by rotating about the axis AZ and therefore can be said to be a door.

The accommodation box 824 is an example of a "second cover".

As illustrated in FIG. 6, the first HDD 21 is fixed to a surface sf1 of the accommodation box 824. The surface sf1 is a surface facing the inner wall surface 826 in the state where the accommodation box 824 covers a part of the inner wall surface 826, of the outer wall surfaces of the accommodation box 824. The surface sf1 can also be said to be a surface located nearest to the inner wall surface 826 in the state where the accommodation box 824 covers a part of the inner wall surface 826.

The printing mechanism 50 is provided inside an inner space ns1 demarcated by the front side and the back side of the printing device P and the inner wall surface 826.

In the description below, a U-axis and a V-axis are used where appropriate, in addition to the Z-axis. The U-axis and the V-axis are each orthogonal to the Z-axis. A UZ plane is parallel to the surface sf1. A direction along the V-axis is the direction of a normal line to the surface sf1. A direction along the V-axis and toward the inner wall surface 826 is referred to as a V1-direction. The direction opposite to the V1-direction is referred to as a V2-direction. Similarly, a direction along the U-axis and toward the axis AZ is referred to as a U1-direction. The direction opposite to the U1-direction is referred to as a U2-direction. The state where the surface sf1 in the pre-additional installation printing device P1 is viewed in the V2-direction from the V1-direction will now be described, using FIG. 7.

Figure 7:
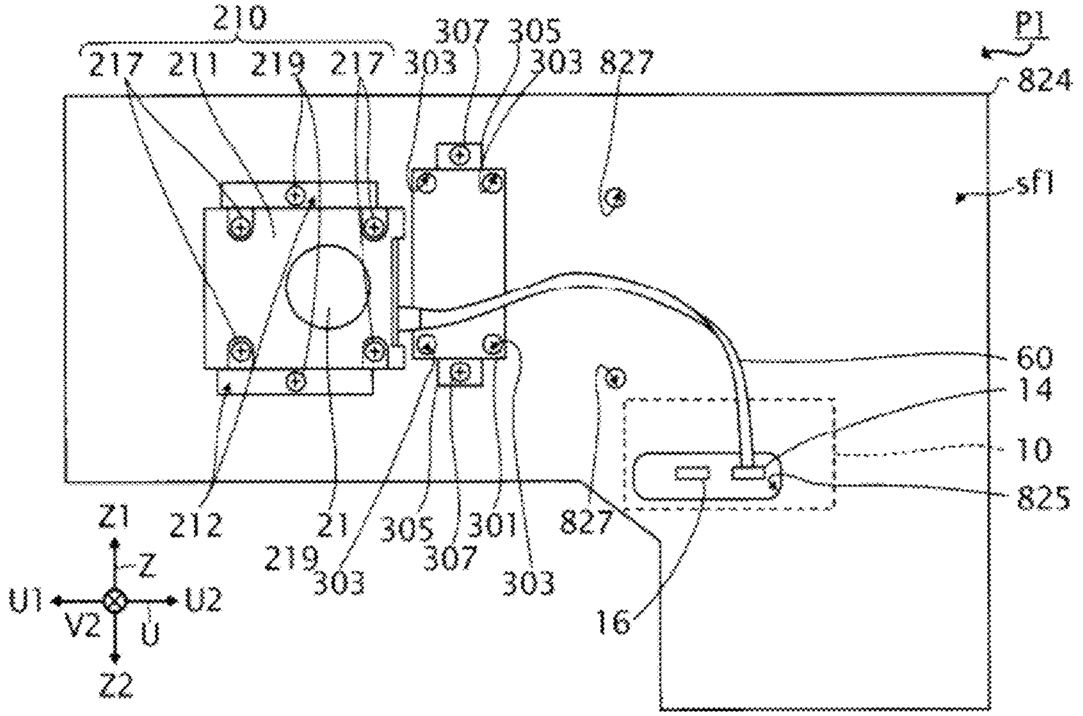
FIG. 7 shows a surface sf1 in the pre-additional installation printing device P1 as viewed in a V2-direction from a V1-direction.

FIG. 7 shows the surface sf1 in the pre-additional installation printing device P1 as viewed in the V2-direction from the V1-direction. As illustrated in FIG. 7, the first HDD 21 is in the shape of a flat rectangular parallelepiped and is fixed to the surface sf1 of the accommodation box 824 along the UZ plane. As illustrated in FIG. 7, the first HDD 21 is fixed to the surface sf1 with a first fixture 210. The first fixture 210 has an HDD metal plate 211, four screws 217, and two screws 219.

The HDD metal plate 211 has a substantially rectangular shape as viewed in the V2-direction. Also, the HDD metal plate 211 is provided with screw holes, not illustrated, corresponding one-to-one to the four screws 217, near the four vertices of the substantially rectangular shape respectively in order to fix the first HDD 21 to the HDD metal plate 211. The first HDD 21 is screwed with the four screws 217 and thus fixed to the HDD metal plate 211. The HDD metal plate 211 is also provided with a flange 212 in each of the Z1-direction and the Z2-direction in order to fix HDD metal plate 211 to the surface sf1. The flange 212 is provided with screw holes, not illustrated, corresponding one-to-one to the two screws 219. Also, the surface sf1 is provided with screw holes, not illustrated, corresponding one-to-one to the two screws 219. The HDD metal plate 211 is screwed with the two screws 219 and thus fixed to the surface sf1. Since the HDD metal plate 211 is fixed to the surface sf1, the first HDD 21 fixed to the HDD metal plate 211, too, is fixed to the surface sf1.

As illustrated in FIG. 7, an intermediate metal plate 301 provided to fix the coupling board 30 to the surface sf1 is fixed to the surface sf1, and an opening 825 and two screw holes 827 are provided in the surface sf1. The intermediate metal plate 301 has a substantially rectangular shape as viewed from the V1-direction. The intermediate metal plate 301 is fixed to the surface sf1 with two screws 307. More specifically, the intermediate metal plate 301 is provided with a flange 305 in each of the Z1-direction and the Z2-direction. The flange 305 is provided with screw holes, not illustrated, corresponding one-to-one to the two screws 307. The intermediate metal plate 301 is screwed with the two screws 307 and thus fixed to the surface sf1. Also, the intermediate metal plate 301 is provided with screw holes 303 for fixing the coupling board 30 to the intermediate metal plate 301, near the four vertices of the substantially rectangular shape respectively. However, in the state where the coupling board 30 is not attached before the additional installation of the second HDD 22, the surface sf1 may be not provided with the intermediate metal plate 301 and the screws 307.

The opening 825 communicates to the inside of the accommodation box 824. A part of the control board 10 provided inside the accommodation box 824 is exposed via the opening 825. In FIG. 7, the outline of the control board 10 is indicated by a dashed line. The size and position of the control board 10 may be any size and position that enable the control board 10 to be accommodated in the accommodation box 824 and are not limited to the example shown in FIG. 7. The communication connector 14 and the power connector 16 are exposed via the opening 825. One end of the communication cable 60 is directly coupled to the communication connector 14. The other end of the communication cable 60 is directly coupled to the first HDD 21.

The two screw holes 827 are provided to fixe the second HDD 22 to the surface sf1. Elements provided at the surface sf1 in the post-additional installation printing device P2 will now be described, using FIG. 8.

Figure 8:
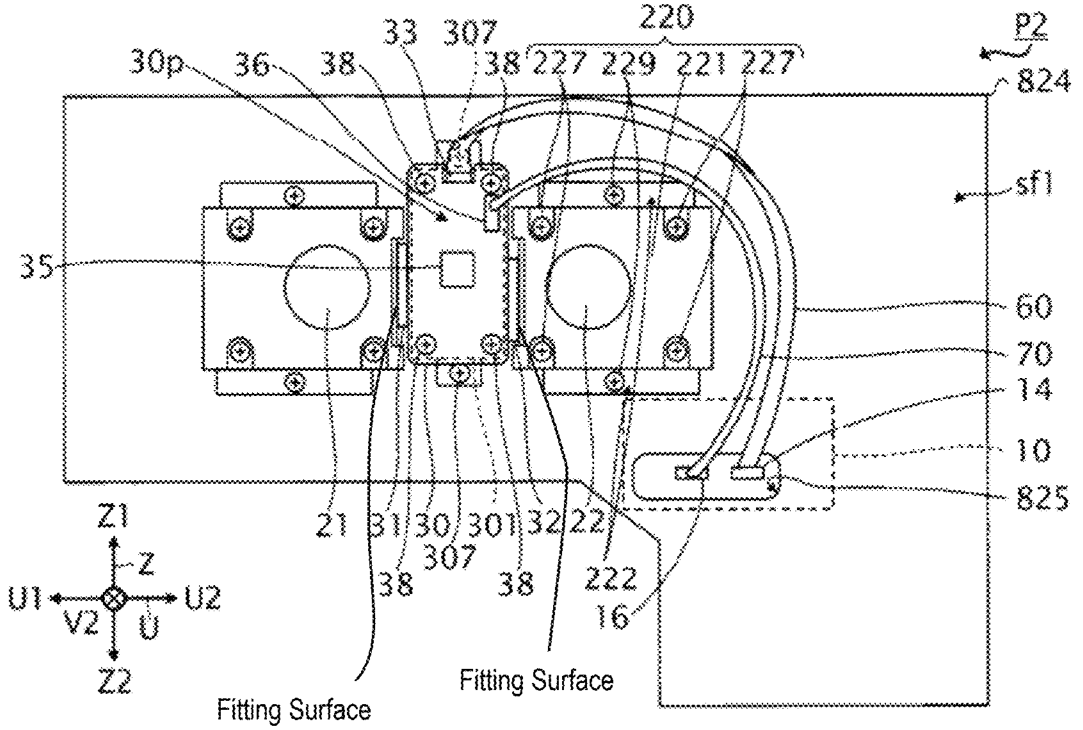
FIG. 8 shows the surface sf1 in the post-additional installation printing device P2 as viewed in the V2-direction from the V1-direction.

FIG. 8 shows the surface sf1 in the post-additional installation printing device P2 as viewed in the V2-direction from the V1-direction. In FIG. 8, some of the reference signs shown in FIG. 7 are omitted in order to prevent the complication of the drawing. As illustrated in FIG. 8, the first HDD 21 is directly coupled to the first connector 31 from the U1-direction. The first connector 31 is provided along the side in the U1-direction of the coupling board 30.

The U1-direction is an example of a "first direction".

The fitting surface where the first connector 31 fits with the first HDD 21 is parallel to a VZ plane. Meanwhile, a surface 30*p* of the coupling board 30 having the first connector 31 is parallel to a UZ plane. That is, the fitting surface of the first connector 31 is orthogonal to the surface 30*p*. A connector such that the fitting surface of the connector and the surface of the board where the connector is attached are orthogonal to each other is referred to as a right-angle type. Therefore, the first connector 31 is the right-angle type.

Also, the coupling board 30 is fixed to the surface sf1 via the intermediate metal plate 301 and four screws 38. The four screws 38 correspond one-to-one to the screw holes 303 provided in the intermediate metal plate 301. The coupling board 30 is screwed with the four screws 38 and thus fixed to the intermediate metal plate 301. Since the intermediate metal plate 301 is fixed to the surface sf1, the coupling board 30 fixed to the intermediate metal plate 301, too, is fixed to the surface sf1.

In FIG. 8, the intermediate metal plate 301 except the flange 305 is shown in a smaller size than the coupling board 30 as viewed in the V2-direction in order to clearly show the coupling board 30 and the intermediate metal plate 301. However, this is not limiting. For example, the intermediate metal plate 301 except the flange 305 may be substantially the same size as the coupling board 30 or greater than the coupling board 30, as viewed in the V2-direction. The term "substantially the same" includes the case where the size can be regarded as the same in consideration of an error in manufacturing, as well as the case where the size is perfectly the same.

As illustrated in FIG. 8, the second HDD 22 is directly coupled to the second connector 32 from the U2-direction. Similarly to the first connector 31, the second connector 32 is the right-angle type. The second connector 32 is provided along the side in the U2-direction of the coupling board 30.

The U2-direction is an example of a "second direction".

As illustrated in FIG. 8, the second HDD 22 is substantially in the shape of a flat rectangular parallelepiped and is fixed to the surface sf1 along the UZ plane. Also, the second HDD 22 is fixed to the surface sf1 in such a way as to be opposite the first HDD 21 via the coupling board 30. That two objects are opposite each other means that the two objects partly or entirely overlap each other as viewed from a certain direction. In this embodiment, the second HDD 22 entirely overlaps the first HDD 21 as viewed from a direction along the U-axis. Although the second HDD 22 may partly overlap the first HDD 21 as viewed from the direction along the U-axis, it is preferable that the second HDD 22 entirely overlaps the first HDD 21.

The second HDD 22 is fixed to the surface sf1 with a second fixture 220. The second fixture 220 has an HDD metal plate 221, four screws 227, and two screws 229. The HDD metal plate 221 has substantially the same shape as the HDD metal plate 211 and has a substantially rectangular shape as viewed in the V2-direction. Also, the HDD metal plate 221 is provided with screw holes, not illustrated, corresponding one-to-one to the four screws 227, near the four vertices of the substantially rectangular shape respectively in order to fix the second HDD 22 to the HDD metal plate 221. The second HDD 22 is screwed with the four screws 227 and thus fixed to the HDD metal plate 221. The HDD metal plate 221 is also provided with a flange 222 in each of the Z1-direction and the Z2-direction in order to fix HDD metal plate 221 to the surface sf1. The flange 222 is provided with screw holes, not illustrated, corresponding one-to-one to the two screws 229. Also, as illustrated in FIG. 7, the surface sf1 is provided with the screw holes 827 corresponding to the two screws 229. The HDD metal plate 221 is screwed with the two screws 229 and thus fixed to the surface sf1. Since the HDD metal plate 221 is fixed to the surface sf1, the second HDD 22 fixed to the HDD metal plate 221, too, is fixed to the surface sf1.

As described with reference to FIG. 2, one end of the communication cable 60 is directly coupled to the communication connector 14 and the other end of the communication cable 60 is directly coupled to the third connector 33. The third connector 33 is provided in a cut-out provided on the side in the Z1-direction of the coupling board 30. One end of the power cable 70 is directly coupled to the power connector 16. The other end of the power cable 70 is directly connected to the power connector 36.

1.3. Production Method for Post-Additional Installation Printing Device P2

A production method in which the additional installation worker attaches the second HDD 22 to the pre-additional installation printing device P1 and thus produces the post-additional installation printing device P2 will now be described, using FIG. 9.

Figure 9:
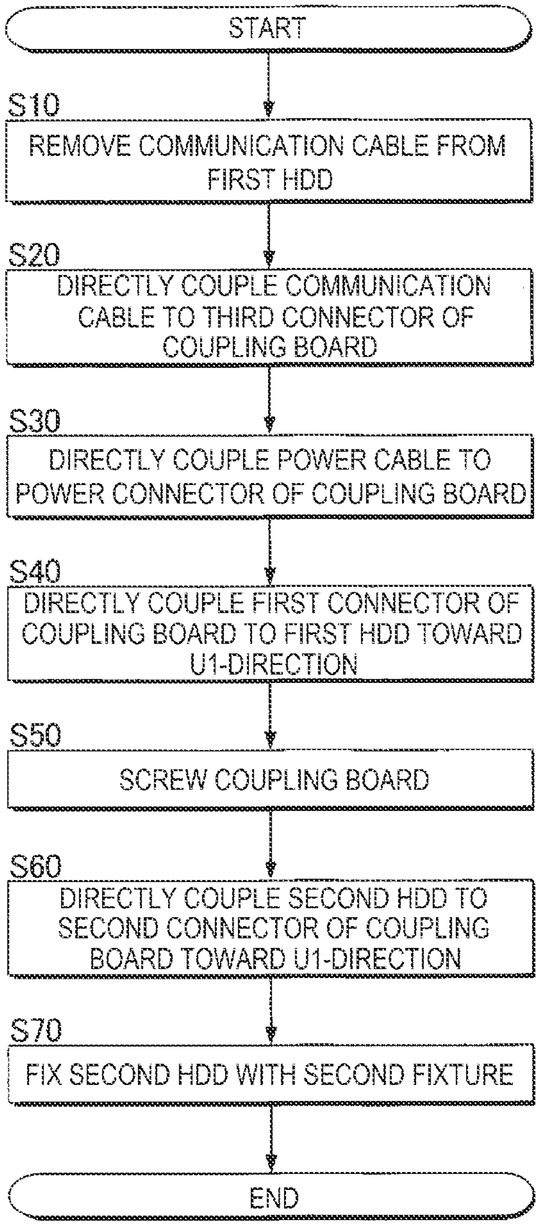
FIG. 9 is a flowchart showing a production method for the post-additional installation printing device P2.

FIG. 9 is a flowchart showing the production method for the post-additional installation printing device P2. Before executing the production method shown in FIG. 9, the additional installation worker removes the cover 82 from the pre-additional installation printing device P1 and also rotates the accommodation box 824 about the axis AZ and thus exposes the surface sf1. In step S10, the additional installation worker removes the communication cable 60 from the first HDD 21. The process of step S10 is equivalent to a "third process". Next, in step S20, the additional installation worker directly couples the communication cable 60 to the third connector 33 of the coupling board 30. The process of step S20 is equivalent to a "fourth process". After the process of step S20 ends, the additional installation worker in step S30 directly couples the power cable 70 to the power connector 36 of the coupling board 30. The additional installation worker can change the order of coupling the cables and may, for example, execute step S30 before step S10.

After the process of step S30 ends, the additional installation worker in step S40 directly couples the first connector 31 of the coupling board 30 to the first HDD 21 toward the U1-direction. The process of step S40 is equivalent to a "fifth process". Next, in step S50, the additional installation worker fastens the four screws 38 and thus fixes the coupling board 30 to the surface sf1.

After the process of step S50 ends, the additional installation worker in step S60 directly couples the second HDD 22 to the second connector 32 of the coupling board 30 toward the U1-direction. More specifically, the additional installation worker translates the second HDD 22 in relation to the coupling board 30 so as to approach the second connector 32 and thus directly couples the second HDD 22 to the second connector 32. As the additional installation worker directly couples the second HDD 22 to the second connector 32 toward the U1-direction, the second HDD 22 is directly coupled to the second connector 32 from the U2-direction. The process of step S60 is equivalent to a "first process".

After the process of step S60 ends, the additional installation worker in step S70 fixes the second HDD 22 to the surface sf1 with the second fixture 220. In connection with the process of step S70, the additional installation worker fastens the four screws 227 and thus fixes the second HDD 22 to the HDD metal plate 221 in advance before the series of processes shown in FIG. 9. Then, in the process of step S70, the additional installation worker fastens the two screws 229 and thus fixes the second HDD 22 to the surface sf1. However, in the process of step S70, the additional installation worker may fasten the four screws 227 to fix the second HDD 22 to the HDD metal plate 221 and fasten the two screws 229 to fix the second HDD 22 to the surface sf1. The process of step S70 is equivalent to a "second process". After the process of step S70 ends, the additional installation worker ends the series of processes shown in FIG. 9.

1.4. Overview of First Embodiment

An overview of the post-additional installation printing device P2, an overview of the production method for a device using the coupling board 30, and an overview of the coupling board 30 are given below.

1.4.1. Overview of Post-Additional Installation Printing Device P2

As described above, the post-additional installation printing device P2 has the first HDD 21, the second HDD 22, the coupling board 30, which is a rigid board, the printing mechanism 50 executing printing, the control board 10, where the control circuit 12 controlling the printing mechanism 50 is provided, and the communication cable 60 with the control board 10 and the coupling board 30 coupled thereto. The coupling board 30 has the first connector 31 with the first HDD 21 directly coupled thereto from the U1-direction, and the second connector 32 with the second HDD 22 directly coupled thereto from the U2-direction, which is different from the U1-direction. The control circuit 12 causes the printing mechanism 50 to execute printing, based on the print data Img read out from one of the first HDD 21 and the second HDD 22 via the communication cable 60 and the coupling board 30.

As described above, the U1-direction, in which the first connector 31 is directly coupled to the first HDD 21, and the U2-direction, in which the second connector 32 is directly coupled to the second HDD 22, differ from each other. Generally, when two forces are in different directions, the magnitude of the resultant force of the two forces combined is smaller than the magnitude of the resultant force of two forces combined when the two forces are in the same direction. Therefore, in the first embodiment, the magnitude of the force applied to the coupling board 30 is smaller than in a configuration where the direction in which the first connector 31 is directly coupled to the first HDD 21 and the direction in which the second connector 32 is directly coupled to the second HDD 22 are the same. Therefore, the probability of the occurrence of an abnormality such as detachment of the coupling board 30 from the surface sf1 or deformation of the coupling board 30 can be reduced. Thus, according to this embodiment, it is easier to attach the first HDD 21 and the second HDD 22 to the coupling board 30 without generating an abnormality in the coupling board 30.

The first connector 31 supplies electric power to the first HDD 21 and also relays the communication between the coupling board 30 and the first HDD 21, based on the SATA standard. The second connector 32 supplies electric power to the second HDD 22 and also relays the communication between the coupling board 30 and the second HDD 22, based on the SATA standard.

According to the first embodiment, by the first connector 31, electric power can be supplied to the first HDD 21 and the communication between the coupling board 30 and the first HDD 21 can be relayed. Similarly, by the second connector 32, electric power can be supplied to the second HDD 22 and the communication between the coupling board 30 and the second HDD 22 can be relayed.

The U2-direction is opposite to the U1-direction.

Since the U2-direction is opposite to the U1-direction, the force applied to the coupling board 30 when the first connector 31 is directly coupled to the first HDD 21 and the force applied to the coupling board 30 when the second connector 32 is directly coupled to the second HDD 22 offset each other. In this embodiment, since the two forces offset each other, the probability of the detachment of the coupling board 30 from the surface sf1 is lower than in a configuration where the direction of the force applied to the coupling board 30 when the first connector 31 is directly coupled to the first HDD 21 and the direction of the force applied to the coupling board 30 when the second connector 32 is directly coupled to the second HDD 22 are not opposite to each other. Thus, it is easier to attach the first HDD 21 and the second HDD 22 to the coupling board 30 without generating an abnormality in the coupling board 30.

The fitting surfaces of the first connector 31 and the second connector 32 are orthogonal to the surfaces of the coupling board 30. That is, the first connector 31 and the second connector 32 are the right-angle type.

A connector such that the fitting surface of the connector and the surface of the board where the connector is attached are parallel to each other is referred to as a straight type. If a configuration where the first connector 31 and the second connector 32 are the straight type is employed, the first HDD 21 and the second HDD 22 are orthogonal to the coupling board 30. Meanwhile, in this embodiment, the first HDD 21 and the second HDD 22 are parallel to the coupling board 30. In the configuration where the first HDD 21 and the second HDD 22 are orthogonal to the coupling board 30, the space occupied by the first HDD 21, the second HDD 22, and the coupling board 30 is greater and therefore the printing device P is greater in size than in the configuration where the first HDD 21 and the second HDD 22 are parallel to the coupling board 30. Thus, according to this embodiment, the printing device P can be made smaller in size than in the configuration where the first connector 31 and the second connector 32 are the straight type.

The coupling board 30 has the integrated circuit 35 communicating with one of the first HDD 21 and the second HDD 22, based on a communication from the control circuit 12. More specifically, in order to implement mirroring, when the integrated circuit 35 has received a communication representing a request to write the print data Img from the control circuit 12, the integrated circuit 35 transmits a communication representing a request to write the print data Img to the first HDD 21 and the second HDD 22. Also, when the integrated circuit 35 has received a communication representing a request to read out the print data Img from the control circuit 12, the integrated circuit 35 transmits a communication representing a request to read out the print data Img to the first HDD 21 or the second HDD 22.

As mirroring is thus implemented by the integrated circuit 35, even when trouble occurs in one HDD of the first HDD 21 and the second HDD 22, data can be read out from the other HDD. Therefore, resistance to trouble can be increased, compared with a configuration where mirroring is not employed.

The post-additional installation printing device P2 also has the exterior 80 having the cover 82 covering the opening 821, and the accommodation box 824 provided inside the opening 821. The coupling board 30, the first HDD 21, and the second HDD 22 are provided in the accommodation box 824.

The additional installation worker removes the cover 82 and also rotates the accommodation box 824 about the axis AZ and thus can expose the surface sf1 where the coupling board 30 and the second HDD 22 are attached. Thus, according to this embodiment, the additional installation worker can more easily add the coupling board 30 and the second HDD 22 to the pre-additional installation printing device P1 than in a configuration where the coupling board 30, the first HDD 21, and the second HDD 22 are provided in the inner space ns1 of the printing device P.

The cover 82 is provided at the back side of the printing device P.

Generally, it is preferable that only an element that the user comes into contact with when the printing device P performs printing is provided at the front side of the printing device P. If the content covered with the cover 82 is provided at the front side of the printing device P, the user may consider that the content covered with the cover 82 needs to be exposed to change print settings. Therefore, the operability of the printing device P drops. If the cover 82 is provided at the back side of the printing device P, it can be suggested that the content covered with the cover 82 is not necessary for print settings. Therefore, the operability of the printing device P can be improved.

The post-additional installation printing device P2 also has the first fixture 210 fixing the first HDD 21 to the surface sf1 of the accommodation box 824, and the second fixture 220 fixing the second HDD 22 to the surface sf1.

According to the first embodiment, the first HDD 21 can be fixed to the surface sf1 with the first fixture 210 and the second HDD 22 can be fixed to the surface sf1 with the second fixture 220.

1.4.2. Overview of Production Method for Device Using Coupling Board 30

Also, this embodiment can also be grasped as a production method for a device using the coupling board 30. The coupling board 30 is a rigid board and has the first connector 31, to which a storage device provided in the U1-direction is directly coupled, and the second connector 32, to which a storage device provided in the U2-direction different from the U1-direction is directly coupled. In the state where the first HDD 21 directly coupled to the first connector 31 is fixed to the surface sf1 of the pre-additional installation printing device P1 and is also coupled to the communication cable 60, the production method for a device using the coupling board 30 includes: the process of step S10 of removing the communication cable 60 from the first HDD 21; the process of step S20 of coupling the communication cable 60 removed in the process of step S10 to the coupling board 30; the process of step S40 of directly coupling the first HDD 21 to the first connector 31 from the U1-direction; the process of step S60 of directly coupling the second HDD 22 to the second connector 32 from the U2-direction; and the process of step S70 of fixing the second HDD 22 to the pre-additional installation printing device P1.

As described above, in the production method for producing the post-additional installation printing device P2 from the pre-additional installation printing device P1, the first HDD 21 fixed to the surface sf1 in the pre-additional installation printing device P1 need not be removed. A configuration where the first HDD 21 is removed from the pre-additional installation printing device P1 includes a case where static electricity occurs when the first HDD 21 is removed and a case where an attachment error occurs when the first HDD 21 is attached again. In the case where static electricity occurs when the first HDD 21 is removed or in the case where an attachment error occurs when the first HDD 21 is attached again, the post-additional installation printing device P2 may not operate normally. According to this embodiment, the probability that the post-additional installation printing device P2 may not operate normally can be reduced, compared with the configuration where the first HDD 21 is removed from the pre-additional installation printing device P1.

In the process of step S60, the second HDD 22 is translated in relation to the coupling board 30 so as to approach the second connector 32. The second HDD 22 is thus directly coupled to the second connector 32.

The second connector 32 is the right-angle type and the coupling board 30 and the second HDD 22 are together fixed along the surface sf1. Therefore, as the second HDD 22 is translated in relation to the coupling board 30 so as to approach the second connector 32, the second HDD 22 is directly coupled to the second connector 32.

In the process of step S60, the second HDD 22 is directly coupled to the second connector 32 in such a way as to be opposite the first HDD 21 directly coupled to the first connector 31, via the coupling board 30.

Even when the magnitude of the force applied to the coupling board 30 when the first HDD 21 is directly coupled to the first connector 31 and the magnitude of the force applied to the coupling board 30 when the second HDD 22 is directly coupled to the second connector 32 are the same and the directions of these forces are opposite to each other, if the directions of these two forces are not on the same straight line, a moment of a force causing rotation is generated in the coupling board 30. If the moment of this force is large, the coupling board 30 may be detached from the surface sf1. In the configuration where the first HDD 21 is opposite the second HDD 22 as in this embodiment, the moment of the force causing rotation in the coupling board 30 can be reduced, compared with a configuration where the first HDD 21 is not opposite the second HDD 22. Therefore, the probability of the detachment of the coupling board 30 from the surface sf1 can be reduced.

In the process of step S70, the HDD metal plate 221 with the second HDD 22 screwed thereto is screwed to the pre-additional installation printing device P1. The second HDD 22 is thus fixed to the pre-additional installation printing device P1.

According to the first embodiment, the second HDD 22 can be fixed to the pre-additional installation printing device P1 by using the HDD metal plate 221.

1.4.3. Overview of Coupling Board 30

The coupling board 30 in this embodiment is a rigid board and has the first connector 31, to which the first HDD 21 provided in the U1-direction is directly coupled, and the second connector 32, to which the second HDD 22 provided in the U2-direction different from the U1-direction is directly coupled.

As described above, it is easier to attach the first HDD 21 and the second HDD 22 to the coupling board 30 in this embodiment than the coupling board 30 where the direction in which the first HDD 21 is directly coupled to the first connector 31 and the direction in which the second HDD 22 is directly coupled to the second connector 32 are the same.

Also, the coupling board 30 also has the third connector 33 coupling the communication cable 60. The communication cable 60 is coupled to the control circuit 12 communicating with one or both of the first HDD 21 and the second HDD 22.

The third connector 33 can also be said to be a general term for a connector mediating a communication of the first HDD 21 directly coupled to the first connector 31 and a connector mediating a communication of the second HDD 22 directly coupled to the second connector 32.

The coupling board 30 also has the integrated circuit 35 communicating with one or both of the first HDD 21 and the second HDD 22, based on a communication from the control circuit 12.

As mirroring is implemented by the integrated circuit 35, even when trouble occurs in one HDD of the first HDD 21 and the second HDD 22, data can be read out from the other HDD. Therefore, resistance to trouble can be increased, compared with a configuration where mirroring is not employed.

The first connector 31 is provided along the side in the U1-direction of the coupling board 30. The second connector 32 is provided along the side in the U2-direction of the coupling board 30.

As the first connector 31 and the second connector 32 are thus provided along the opposite sides to each other, the force applied to the coupling board 30 when the first HDD 21 is directly coupled to the first connector 31 and the force applied to the coupling board 30 when the second HDD 22 is directly coupled to the second connector 32 can offset each other. Thus, it is easier to attach the first HDD 21 and the second HDD 22 to the coupling board 30 without generating an abnormality in the coupling board 30.

2. Modification Examples

Each configuration described above can be modified in various manners. Some examples of specific modified aspects will now be described. Two or more aspects arbitrarily selected from the examples below can be combined together where appropriate without being mutually contradictory.

2-1. First Modification Example

The direction in which the coupling board 30, the first HDD 21, and the second HDD 22 are attached together is not limited to the configuration in the first embodiment. For example, these parts may be attached, laid next to each other on the XY plane. Even when attached on the UZ plane, these parts may be arbitrarily rotated from the configuration in the first embodiment or left-right reversed.

2-2. Second Modification Example

In each of the above configurations, the first HDD 21 and the second HDD 22 create RAID 1. However, this is not limiting. For example, the first HDD 21 and the second HDD 22 may create RAID 0 or JBOD. JBOD is an abbreviation of just a bunch of disks.

2-3. Third Modification Example

In each of the above configurations, two HDDs are coupled to the coupling board 30. However, three or more HDDs may be coupled to the coupling board 30.

Figure 10:
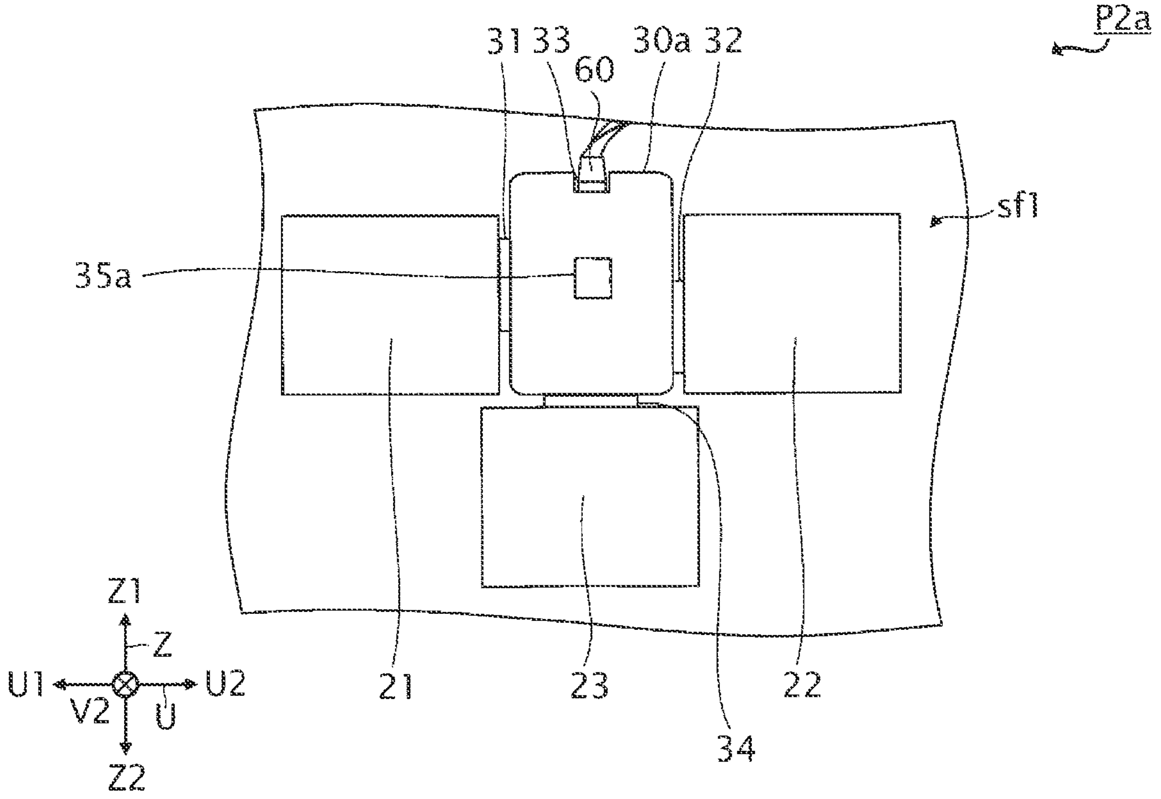
FIG. 10 shows the surface sf1 in a third modification example, as viewed in the V2-direction from the V1-direction.

FIG. 10 shows the surface sf1 in the third modification example as viewed in the V2-direction from the V1-direction. In FIG. 10, in order to prevent the complication of the drawing, fixtures fixing HDDs and a coupling board 30*a* to the surface sf1 are not illustrated. A post-additional installation printing device P2*a* in the third modification example differs from the post-additional installation printing device P2 in having the coupling board 30*a* instead of the coupling board 30, and having a third HDD 23.

The coupling board 30*a* differs from the coupling board 30 in having an integrated circuit 35*a* instead of the integrated circuit 35, and having a fourth connector 34. The fourth connector 34 is provided along the side in the Z2-direction of the coupling board 30*a*. The fourth connector 34 is the right-angle type, similarly to the first connector 31 and the second connector 32. The third HDD 23 is directly coupled to the fourth connector 34 from the Z2-direction.

The integrated circuit 35*a* communicates with one or a plurality of HDDs of the first HDD 21, the second HDD 22, and the third HDD 23, based on a communication from the control circuit 12. For example, the integrated circuit 35*a* may configure RAID 5 with the first HDD 21, the second HDD 22, and the third HDD 23.

2-4. Fourth Modification Example

In the first embodiment, the first HDD 21 is coupled to the first connector 31 from the U1-direction and the second HDD 22 is coupled to the second connector 32 from the U2-direction, which is opposite to the U1-direction. However, this is not limiting. For example, the second HDD 22 may be coupled to the second connector 32 from the Z2-direction. In the fourth modification example, the second connector 32 is provided along the side in the Z2-direction of the coupling board 30.

In the fourth modification example, the Z2-direction of an example of the "second direction".

2-5. Fifth Modification Example

In the first embodiment, the first modification example, and the fourth modification example, the control circuit 12 causes the printing mechanism 50 to execute printing, based on the print data Img read out from the first HDD 21 or the second HDD 22. However, the print data Img may be read out from the first HDD 21 and the second HDD 22. For example, the integrated circuit 35 reads out a part of the print data Img from the first HDD 21, reads out the rest of the print data Img from the second HDD 22, and generates the print data Img based on the part of the print data Img and the rest of the print data Img. The integrated circuit 35 then transmits the generated print data Img to the control circuit 12.

2-6. Sixth Modification Example

In each of the above configurations, an HDD is used as an example of a "first storage device" and a "second storage device". However, a storage device other than an HDD may be employed. The storage device other than an HDD is an SSD, for example. SSD is an abbreviation of solid-state drive. Of the two storage devices coupled to the coupling board 30, one may be an HDD and the other may be an SSD. Also, with these storage devices, a connector conforming to a different standard from SATA may be employed.

2-7. Seventh Modification Example

In each of the above configurations, the communication cable 60 is an example of the "coupling mechanism". However, this is not limiting. For example, the coupling mechanism may be two communication cables and a communication circuit coupled to each of the two communication cables. For example, in the post-additional installation printing device P2 in the seventh modification example, one end of one communication cable, of the two communication cables, is directly coupled to the communication connector 14, and the other end of the one communication cable is directly coupled to the communication circuit. Also, one end of the other communication cable, of the two communication cables, is directly coupled to the third connector 33, and the other end of the other communication cable is directly coupled to the communication circuit. The communication cables and a power cable for supplying electric power may be integrated together or may be independent of each other. Also, the connectors used on the control board 10 may be the same or different between before and after an additional storage device is installed.

2-8. Eighth Modification Example

In each of the above configurations, the cover 82 is provided at the back side of the printing device P. However, the cover 82 may be provided at a lateral side of the printing device P. The eighth modification example can suggest that the content covered with the cover 82 is not necessary for print settings, and therefore can improve the operability of the printing device P, compared with a configuration where the cover 82 is provided at the front side of the printing device P.

2-9. Ninth Modification Example

In each of the above configurations, the first fixture 210 has the HDD metal plate 211, the four screws 217, and the two screws 219. However, this is not limiting. A part or all of these may be a different fixture. For example, an adhesive bonding the first HDD 21 to the surface sf1 may be used as the first fixture. Similarly, the second fixture 220 may be an adhesive bonding the second HDD 22 to the surface sf1. Also, the first fixture may be omitted if the first HDD 21 and the surface sf1 can be mechanically joined and fixed together. The same applies to the second fixture.

2-10. Tenth Modification Example

In the first embodiment, the second HDD 22 farther from the axis AZ, of the first HDD 21 and the second HDD 22, is additionally installed to produce the post-additional installation printing device P2. However, the first HDD 21 closer to the axis AZ may be additionally installed to produce the post-additional installation printing device P2. In the tenth modification example, the additional installation worker translates the first HDD 21 toward the U2-direction and thus directly couples the first HDD 21 to the first connector 31 in the process of step S60. However, in order to translate the first HDD 21 toward the U2-direction, the additional installation worker grasps the first HDD 21 from the U1-direction and the arm or the like of the additional installation worker may come into contact with the inner wall surface 826, making it difficult for the additional installation worker to work. Therefore, in the first embodiment, the post-additional installation printing device P2 can be produced more easily than in the tenth modification example.

2-11. Eleventh Modification Example

In the first embodiment, the coupling board 30 and the second HDD 22 are attached to the pre-additional installation printing device P1, thus producing the post-additional installation printing device P2. However, this is not limiting. For example, in the state where the first HDD 21 is not fixed to the surface sf1, the production worker producing the post-additional installation printing device P2 may execute a series of processes shown in FIG. 11 to produce the post-additional installation printing device P2.

Figure 11:
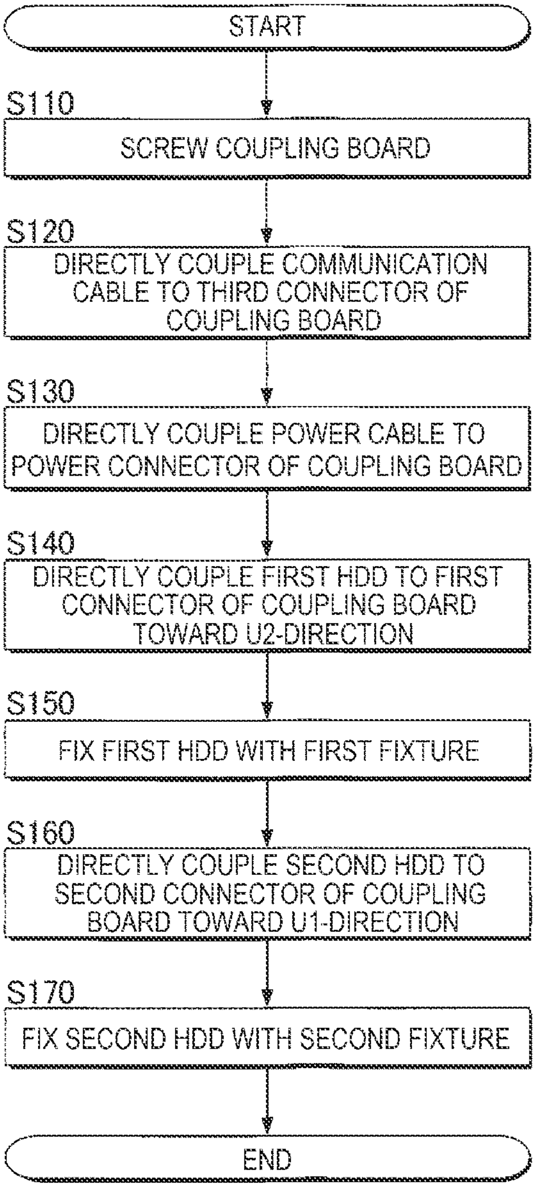
FIG. 11 is a flowchart showing a production method for the post-additional installation printing device P2 in an eleventh modification example.

FIG. 11 is a flowchart showing the production method for the post-additional installation printing device P2 in the eleventh modification example. Before executing the production method shown in FIG. 11, the production worker removes the cover 82 from the printing device P, where the first HDD 21, the second HDD 22, and the coupling board 30 are not fixed to the surface sf1, and the production worker also rotates the accommodation box 824 about the axis AZ to expose the surface sf1.

In step S110, the production worker fastens the four screws 38 and thus fixes the coupling board 30 to the surface sf1. After the process of step S110 ends, the production worker directly couples the communication cable 60 to the third connector 33 of the coupling board 30 in step S120. After the process of step S120 ends, the production worker directly couples the power cable 70 to the power connector 36 of the coupling board 30 in step S130. As in the first embodiment, the order of coupling the cables can be changed. For example, the production worker can execute step S130 before step S110.

After the process of step S130 ends, the production worker directly couples the first HDD 21 to the first connector 31 of the coupling board 30 toward the U2-direction in step S140. As the production worker directly couples the first HDD 21 to the first connector 31 of the coupling board 30 toward the U2-direction, the first HDD 21 is directly coupled to the first connector 31 from the U1-direction.

After the process of step S140 ends, the production worker fixes the first HDD 21 to the surface sf1 with the first fixture 210 in step S150. In connection with the process of step S150, too, as with the process of step S70, the production worker may fasten the four screws 217 and thus fix the first HDD 21 to the HDD metal plate 211 in advance before the series of processes shown in FIG. 11. After the process of step S150 ends, the production worker directly couples the second HDD 22 to the second connector 32 of the coupling board 30 toward the U1-direction in step S160. As the production worker directly couples the second HDD 22 to the second connector 32 toward the U1-direction, the second HDD 22 is directly coupled to the second connector 32 from the U2-direction. In the eleventh modification example, the process of step S160 is equivalent to the "first process".

After the process of step S160 ends, the production worker fixes the second HDD 22 to the surface sf1 with the second fixture 220 in step S170. In connection with the process of step S170, too, as with the process of step S70 and the process of step S150, the production worker may fasten the four screws 227 and thus fix the second HDD 22 to the HDD metal plate 221 in advance before the series of processes shown in FIG. 11. In the eleventh modification example, the process of step S170 is equivalent to the "second process". After the process of step S170 ends, the production worker ends the series of processes shown in FIG. 11.

The production method in the eleventh modification example, too, includes the process of step S160 of directly coupling the second HDD 22 to the second connector 32 from the U2-direction and the process of step S170 of fixing the second HDD 22 to the pre-additional installation printing device P1.

According to the eleventh modification example, the post-additional installation printing device P2 can be produced even in the state where the first HDD 21 is not fixed to the surface sf1.

The order of the processes in the first embodiment and the eleventh modification example is not limited. For example, the first process may be executed after the second process, instead of executing the second process after the first process. Specifically, in the printing device P, where the first HDD 21, the second HDD 22, and the coupling board 30 are not fixed to the surface sf1, the production worker may fix the second HDD 22 to the surface sf1 and subsequently directly couple the second connector 32 of the coupling board 30 to the second HDD 22 toward the U2-direction.

2-12. Twelfth Modification Example

In the first embodiment, the coupling board 30 and the second HDD 22 are attached to the pre-additional installation printing device P1, thus producing the post-additional installation printing device P2. However, the coupling board 30 may be attached to the pre-additional installation printing device P1 in advance, and the second HDD 22 may be the attached to produce the post-additional installation printing device P2. In this case, the second HDD 22 is attached and the setting of the integrated circuit 35 is changed to a setting for using only the first HDD 21 to a setting for using the first HDD 21 and the second HDD 22. A convenient trigger for this change can be employed where appropriate. The worker may use a jumper pin to give an instruction, thus changing the setting. Alternatively, the integrated circuit 35 may detect that the second HDD 22 is coupled, and then automatically change the setting.

2-13. Thirteenth Modification Example

In each of the above configurations, the printing device P may not have the scanning function.

2-14. Fourteenth Modification Example

As the printing device P described in each of the above configurations, various devices such as a facsimile machine and a copy machine can be employed as well as a dedicated device for printing.

2-15. Fifteenth Modification Example

In each of the above configurations, the coupling board 30 is attached to the printing device P. However, the coupling board 30 may be attached to a device that does not execute print processing. For example, the coupling board 30 may be attached to an electronic device such as a projector, a scanner, or a PC. In the fifteenth modification example, this electronic device is an example of a "device using a coupling board".

2-16. Sixteenth Modification Example

In each of the above configurations, a storage device such as an HDD is directly coupled as an example of a "unit" to the first connector 31 and the second connector 32 of the coupling board 30. However, a unit other than a storage device may be directly coupled. The unit other than a storage device is, for example, a communication unit communicating with a device outside the printing device P.

What is claimed is:

1. A production method for a printing device using a coupling board, the printing device includes
- a first unit,
- a second unit,
- the coupling board being a rigid board, the coupling board having
  - a first connector to which the first unit provided in a first direction is directly coupled, and
  - a second connector to which the second unit provided in second direction that is different from the first direction is directly coupled,
  - a printing mechanism that execute printing,
  - a control board on which a control circuit that controls the printing mechanism is disposed,
  - a coupling mechanism connecting the control board and the coupling board,
  - an exterior having a cover that covers a first opening,
  - a second cover disposed inside the first opening, the second cover having an outer wall surface that defines an internal space, and having a second opening that is formed in the outer wall surface and that communicates the internal space with an outside of the second cover,
  - the first unit and the coupling board being fixed to the outer wall surface of the second cover,
  - the control board being disposed in the internal space,
  - the coupling mechanism connecting the control board and the coupling board via the second opening,
  - the production method comprising:
- directly coupling the second unit to the second connector from the second direction; and
- fixing the second unit to the outer wall surface of the second cover.

2. The production method according to claim 1, further comprising:
- in a state where the first unit directly coupled to the first connector is fixed to the outer wall surface and coupled to the coupling mechanism,
- removing the coupling mechanism from the first unit;
- coupling to the coupling board the coupling mechanism removed in the removing; and
- directly coupling the first unit to the first connector from the first direction.

3. The production method according to claim 1, wherein the second unit is translated in relation to the coupling board so as to approach the second connector, and the second unit is thus directly coupled to the second connector.

4. The production method according to claim 1, wherein the second unit is directly coupled to the second connector in such a way as to be opposite the first unit directly coupled to the first connector, via the coupling board.

5. The production method according to claim 1, wherein a metal plate with the second unit screwed thereto is screwed to the device outer wall surface, and the second unit is thus fixed to the outer wall surface.

6. A coupling board which is a rigid board and has sides, the coupling board comprising:
- a first connector disposed on a first side among the sides, and directly connectable to a first unit that is provided in a first direction relative to the coupling board;
- a second connector disposed on a second side among the sides, and directly connectable to a second unit that is provided in a second direction relative to the coupling board, the second side being different from the first side, the second direction being different from the first direction; and a third connector disposed on a third side among the sides, and directly connectable to a communication cable coupled to a communication board that includes a communication circuit communicating with one or both of the first unit and the second unit, the third side being different from the first side and the second side.

7. The coupling board according to claim 6, further comprising:

an integrated circuit communicating with the one or both of the first unit and the second unit, based on a communication from the communication circuit.

8. The coupling board according to claim 6, wherein the first connector supplies electric power to the first unit and also relays a communication between the coupling board and the first unit, based on a SATA standard, and the second connector supplies electric power to the second unit and also relays a communication between the coupling board and the second unit, based on the SATA standard.

9. The coupling board according to claim 6, wherein a fitting surface of the first connector and the second connector is orthogonal to a surface of the coupling board.

10. The coupling board according to claim 6, wherein the first connector is provided along the first side in the first direction of the coupling board, and the second connector is provided along the second side in the second direction of the coupling board.

* * * * *